Aug. 1, 1933.   E. C. TILLY   1,920,447
VEHICLE WINDSHIELD WIPER, THE LIKE NORMALLY USED
ON MOTOR CARS AND OTHER PROPELLED CARRIAGES
Filed Aug. 24, 1932   2 Sheets-Sheet 1
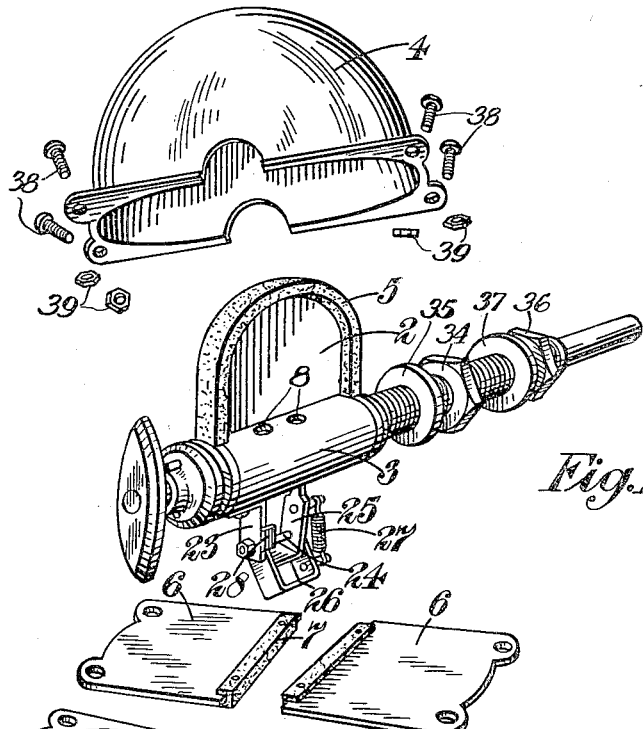
Fig.1.
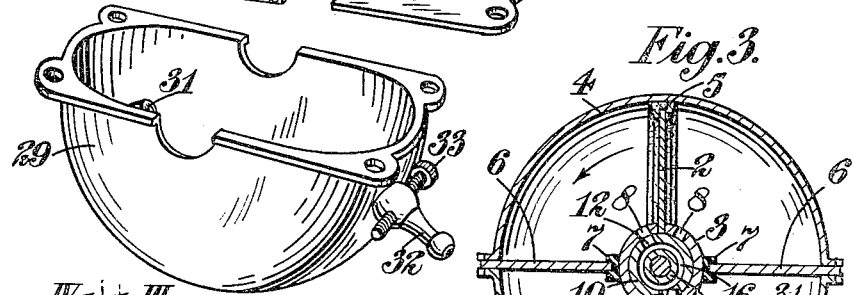
Fig.3.
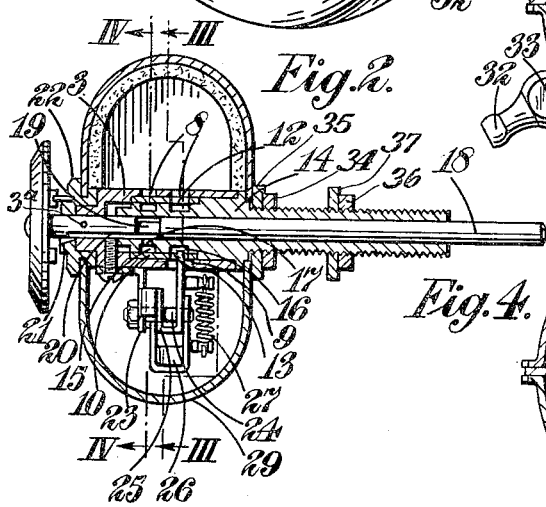
Fig.2.
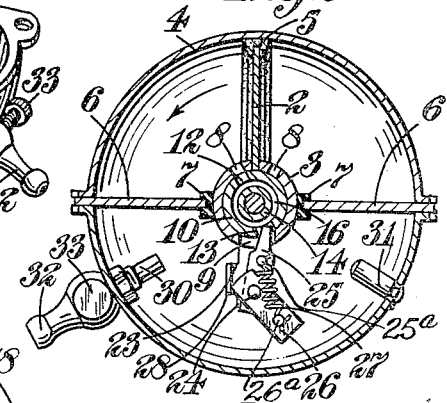
Fig.4.
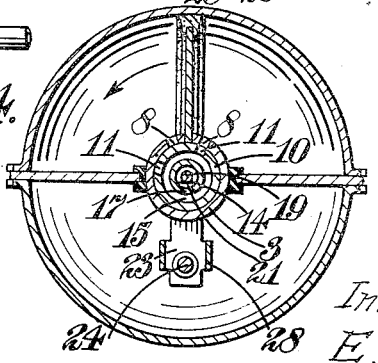
Inventor:
E. C. Tilly,
By Mawhinney & Mawhinney,
Attys.

Aug. 1, 1933. E. C. TILLY 1,920,447
VEHICLE WINDSHIELD WIPER, THE LIKE NORMALLY USED
ON MOTOR CARS AND OTHER PROPELLED CARRIAGES
Filed Aug. 24, 1932 2 Sheets-Sheet 2

Inventor
E. C. Tilly,
By Mawhinney & Mawhinney
Attys.

Patented Aug. 1, 1933

1,920,447

UNITED STATES PATENT OFFICE 1,920,447

VEHICLE WINDSHIELD WIPER, THE LIKE NORMALLY USED ON MOTOR CARS AND OTHER PROPELLED CARRIAGES

Ernest Clayton Tilly, Ilford, England

Application August 24, 1932, Serial No. 630,311, and in Great Britain July 17, 1931

3 Claims. (Cl. 121—97)

This invention relates to windshield wiper motors of the kind in which a driving vane is oscillated about an axis within a casing by differences of fluid pressure, the control of the fluid pressure being effected by valve means automatically actuated by movement of the vane and preferably spring-pressed in both directions. The primary object is to provide an improved construction which is very compact and will be relatively inexpensive to produce.

According to the main feature of the invention, the valve means includes a sleeve attached to the vane and provided with ports on each side thereof, and a co-operating sleeve valve arranged internally of the sleeve is oscillated as the vane approaches its extreme positions so that the different fluid pressures are alternately applied to the opposite sides of the vane.

According to a further feature of the invention, there is a circular casing divided by a substantially diametrical partition, and one portion houses the vane whilst the other encloses actuating means for the sleeve valve, this being arranged axially of the casing.

In the accompanying drawings,

Figure 1 is a perspective view of the component parts of a windshield wiper motor driving mechanism adapted in accordance with the invention, Figure 2 is a central vertical section of the assembled wiper motors mechanism, Figures 3 and 4 are sections on the lines III—III and IV—IV, respectively, of Figure 2, to show the relative positions of the ports in one position of the valve.

Like numerals indicate like parts throughout the drawings.

Figure 5:
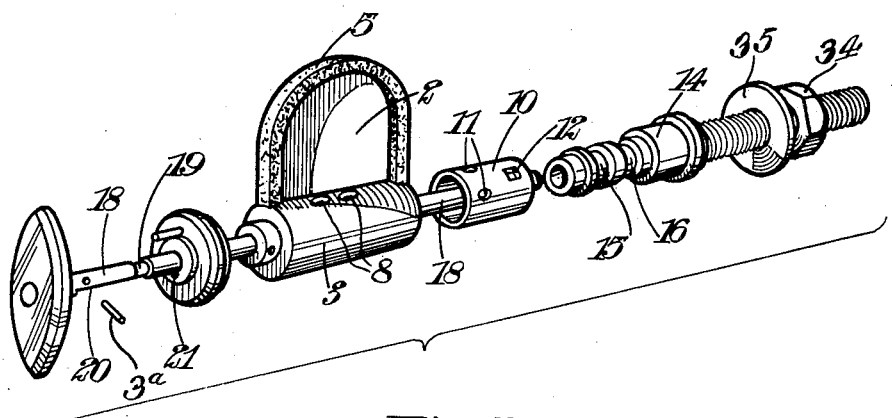
Figure 5 is a detail perspective exploded view of the driving vane and associated parts.

In this construction, the driving vane 2 is attached to a sleeve 3 and disposed within a semi-circular casing 4 the cross section of which corresponds to the external shape of the vane. A packing strip 5 of felt, leather, or the like is attached to the edge of the vane to prevent leakage past it. The opening in the casing 4 is closed by a diametrical partition shown in the form of radially-arranged plates 6, 6 one on each side of the sleeve 3, these being provided with packing pieces 7, 7 which engage the periphery of the sleeve.

On each side of the vane the part of the sleeve within the casing is provided with two spaced holes or ports 8, 8, and a single hole or port 9 is formed in the lower part of the sleeve outside the casing, as shown in Figures 2 and 3. A sleeve-valve 10, disposed internally of the sleeve 3, has in its upper wall a pair of ports 11, 11 arranged for co-operation with two of the ports 8, 8, one on each side of the vane, as shown in Figure 4, and another single port 12 for co-operation with the other two ports 8, 8, as shown in Figures 2 and 3. Opposite this single port 12, the valve has a further port 13 which co-operates with that at 9 in the outer sleeve 3, as shown in Figures 2 and 3.

Extending into both the sleeve 3 and sleeve-valve 10 is a tubular bearing member 14 which has two spaced grooves 15 and 16 formed near its inner end and arranged in the planes of the ports, as shown in Figures 2—4. A radial hole 17 connects the groove 15 with the interior of the member 14.

The wiping element (not shown) is fixed to a spindle 18 which extends freely through the member 14 and is fixed to the sleeve 3 by a pin 3ª or other suitable means. The spindle 18 has attached to it in any suitable manner a disk or knob 18a, by which the wiper may be manually operated if desired. A groove 19 is formed in the spindle 18 where the hole 17 communicates with the interior of the member 14, and a cut-away part 20 on the spindle connects this groove with the atmosphere through a hole 21 provided in a collar 22 freely mounted on both the spindle 18 and a reduced end of the sleeve 3.

Attached to the underside of the sleeve 3 is a downwardly projecting bracket 23 which has pivoted to it at 24 an upwardly opening upper U-shaped member 25 and an upwardly opening lower similarly shaped member 26, the member 25 being arranged within the other as shown in Figures 1–3. One of the limbs of the member 25 is longer than the other and extends through the port 9 in the sleeve 3 and engages the sleeve-valve 10 by entering the port 13 therein. A spring 27 is attached to the two U-shaped members by pins 25ª and 26ª, being anchored on each side of the pivot 24 so that they are normally biassed to a position such as that shown in Figure 1 or Figure 3. Stops 28 on the bracket 23 prevent the spring from collapsing the members 25, 26 beyond a predetermined amount.

These members and the lower part of the sleeve 3 are enclosed by a semi-circular casing 29 similar to that marked 4, the two casings with the interposed plates 6, 6 being clamped together by means of screws 38 and lock-nuts 39.

In the lower casing 29 is a pair of spaced projections 30, 31, that at 30 being a hollow valve port and provided externally of the casing with a nipple portion 32 to which a flexible pipe, connected with a source of suction or pressure, may be attached.

The tubular bearing member 14 extends from one side of the jointed casings and is screw-threaded externally and locked to the casings by means of a nut 34 and a washer 35. This projecting part may be used for attaching the device to a transverse member of the windshield frame as it can be passed through a hole therein and clamped by a nut 36 and a washer 37 on the outside of the frame.

When applied to a windshield of a motor-car, the nipple is preferably connected with the induction pipe of the engine, not shown, and operation is controlled by a valve 33 adapted to open or close the passage through the nipple.

In Figures 3 and 4 it is assumed that the driving vane 2 is being operated in the direction of the arrow and the relative positions of the various ports for effecting this are clearly shown. By reference to Figure 3 it will be seen that air is being withdrawn from the left hand side of the vane through the port 8 on that side of the vane, the port 12 in the sleeve valve, the groove 16 in the member 14, the lower sleeve-valve port 13, and the lower port 9 in the sleeve 3. As this is being effected air is entering on the right-hand side of the vane through the hole 21, along the cutway portion 29 of the spindle 18, through the port 17 to the groove 15, and the ports 11 and 8 respectively, as can be clearly seen by reference to Figure 4. When the vane approaches its extreme position the member 26 engages the projection 31 and slight further movement of the vane causes the spring anchorages 25ª and 26ª to come into line with the pivot 24 after which the spring causes the two members 25 and 26 to be thrown over to the opposite position (such as shown in Figure 1). The long arm of the member 25 therefore moves the sleeve-valve automatically to its new position when the various ports will be so disposed that the side of the vane previously subjected to atmospheric pressure will now be subjected to suction until the valve 10 is again thrown over by the member 26 engaging the projection 30 and the same series of operations will be continued so long as the valve 33 is open. The housing 29 serves as the passage for the negative pressure connecting projection 30 with the valve 10. Different fluid pressures are thus alternately applied to opposite sides of the vane to cause it to oscillate within the casing, the sleeve-valve being automatically actuated by the movement of the vane.

By means of the invention, a very compact windshield wiper motor is provided and one in which manufacturing costs can be kept very low as various parts can be formed as pressings whilst others can be made from tubing or bar.

What I claim as my invention and desire to secure by Letters Patent of the United States is:—

1. A windshield wiper comprising a closed casing having detachably connected portions, a driving vane, a sleeve attached to the vane and disposed within the casing, said sleeve having a first and second set of ports opening at opposite sides of the vane and a port diametrically opposite said sets of ports, a concentric sleeve valve disposed in the sleeve, said sleeve valve having port openings at opposite sides to cooperate with the first set of ports in the sleeve, and opposed ports to cooperate with the second set and the diametrically opposed ports of the sleeve, a spring controlled shifting member mounted on the sleeve and connected to the sleeve valve, and spaced stops mounted in the casing for engaging the shifting member upon oscillation of the vane and the sleeves with the shifting member to actuate the latter and turn the sleeve valve in the sleeve and reverse the relation of the ports therein.

2. A windshield wiper including a circular casing divided by a substantially diametrical partition into two compartments, an oscillating vane housed in one compartment of said casing, a sleeve attached to the vane and disposed within the casing, said sleeve having a first and second set of ports opening at opposite sides of the vane and a port diametrically opposite said sets of ports, a concentric sleeve valve disposed in the sleeve, said sleeve valve having port openings at opposite sides to cooperate with the first set of ports in the sleeve, and opposed ports to cooperate with the second set and the diametrically opposed ports of the sleeve, said sleeve valve structure being arranged axially of said casing and supporting the inner end of the vane and acting to insure that different fluid pressures are alternately applied to opposite sides of said vane, and actuating means for the sleeve valve structure housed in the other compartment of the casing.

3. A windshield wiper, comprising a casing having a pair of semi-circular sections secured together, a partition clamped between the sections to divide the casing into separate compartments, an oscillating vane housed in one of the compartments, a sleeve attached to the vane and disposed within the casing, said sleeve having a first and second set of ports opening at opposite sides of the vane and a port diametrically opposite said sets of ports, a concentric sleeve valve disposed in the sleeve, said sleeve valve having port openings at opposite sides to cooperate with the first set of ports in the sleeve and opposed ports to cooperate with the second set and the diametrically opposed ports of the sleeve, said sleeve valve structure ports opening into the respective compartments of the casing, and actuating means disposed in the other compartment of the casing for the valve structure to control the oscillation of the vane.

ERNEST CLAYTON TILLY.